(12) United States Patent
Sohn

(10) Patent No.: US 11,183,066 B2
(45) Date of Patent: Nov. 23, 2021

(54) METHOD AND APPARATUS FOR ANALYZING DRIVING TENDENCY AND SYSTEM FOR CONTROLLING VEHICLE

(71) Applicant: MANDO CORPORATION, Pyeongtaek-si (KR)

(72) Inventor: Youngsub Sohn, Seoul (KR)

(73) Assignee: Mando Corporation, Pyeongtaek-si (KR)

( * ) Notice: Subject to any disclaimer, the term of this patent is extended or adjusted under 35 U.S.C. 154(b) by 0 days.

(21) Appl. No.: 16/717,770

(22) Filed: Dec. 17, 2019

(65) Prior Publication Data

US 2020/0126420 A1  Apr. 23, 2020

Related U.S. Application Data

(63) Continuation of application No. 16/595,827, filed on Oct. 8, 2019.

(30) Foreign Application Priority Data

Oct. 8, 2018  (KR) .......................... 10-2018-0120060

(51) Int. Cl.
*G08G 1/16* (2006.01)
*G06K 9/00* (2006.01)
*G01S 13/86* (2006.01)
*H04N 5/225* (2006.01)
(Continued)

(52) U.S. Cl.
CPC ......... *G08G 1/163* (2013.01); *G06K 9/00798* (2013.01); *G06K 9/00805* (2013.01); *G08G 1/162* (2013.01); *G08G 1/166* (2013.01); *G01S 13/867* (2013.01); *G01S 13/931* (2013.01); *G01S 2013/9323* (2020.01); *G01S 2013/9325* (2013.01); *G06K 2209/23* (2013.01); *H04L 67/12* (2013.01); *H04N 5/2253* (2013.01)

(58) Field of Classification Search
CPC combination set(s) only.
See application file for complete search history.

(56) References Cited

U.S. PATENT DOCUMENTS

| 8,041,494 B2 | 10/2011 | Kubotani et al. |
| 9,147,353 B1 * | 9/2015 | Slusar ................... G06Q 40/08 |
| 10,493,994 B1 * | 12/2019 | Fields .................. G08G 1/0112 |

(Continued)

*Primary Examiner* — Francis Geroleo
(74) *Attorney, Agent, or Firm* — Morgan, Lewis & Bockius LLP

(57) ABSTRACT

Disclosed are a method and an apparatus for analyzing a driving tendency and a system for controlling a vehicle. The apparatus includes: an image sensor disposed in a vehicle so as to have a field of view exterior of the vehicle, the image sensor configured to capture image data; and a controller comprising at least one processor configured to process the image data captured by the image sensor, wherein the controller is configured to: identify a plurality of objects present in the field of view, responsive at least in part to processing of the image data; determine whether an event is generated, based on at least one of a processing result of the image data and pre-stored driving information of the vehicle; analyze a driving tendency of a driver, based on the driving information and the processing result of the image data, when it is determined that the event is generated; and set a driving level corresponding to the driving tendency of the driver.

17 Claims, 11 Drawing Sheets

(51) Int. Cl.
    *G01S 13/931*     (2020.01)
    *H04L 29/08*     (2006.01)

(56) References Cited

U.S. PATENT DOCUMENTS

| | | | |
|---|---|---|---|
| 2015/0191177 A1* | 7/2015 | Boss | B60W 40/08 |
| | | | 701/1 |
| 2017/0061812 A1* | 3/2017 | Lahav | G09B 9/042 |
| 2018/0208195 A1* | 7/2018 | Hutcheson | G05D 1/0088 |
| 2019/0333371 A1* | 10/2019 | Julian | G06K 9/00845 |

* cited by examiner

METHOD AND APPARATUS FOR ANALYZING DRIVING TENDENCY AND SYSTEM FOR CONTROLLING VEHICLE

CROSS REFERENCE TO RELATED APPLICATION

This application is a continuation patent application of U.S. patent application Ser. No. 16/595,827, filed on Oct. 8, 2019, which claims priority from Korean Patent Application No. 10-2018-0120060, filed on Oct. 8, 2018, which is hereby incorporated by reference for all purposes as if fully set forth herein.

BACKGROUND OF THE INVENTION

1. Field of the Invention

The present disclosure relates to a method and an apparatus for analyzing a driving tendency and a system for controlling a vehicle.

2. Description of the Prior Art

With the recent development of vehicle control technology, an Advanced Driver Assistance System (ADAS) has been developed. The ADAS system increases driving safety and convenience of a vehicle by controlling braking of the vehicle when a driver of a preceding vehicle slams on the brakes or by properly controlling a steering angle and a speed of the vehicle when the vehicle changes lanes.

The ADAS includes an Autonomous Emergency Braking (AEB) system for helping in braking of the vehicle and a Lane Changing Assistance System (LCAS) for preventing a collision with an adjacent vehicle and warning of danger when the vehicle changes lanes.

Meanwhile, driving tendencies of drivers are different from each other. For example, there are some drivers who change lanes without turning on a turn signal and other drivers suddenly change lanes. Since drivers have different driving tendencies, it is difficult to properly control the vehicle unless the driving tendencies are considered.

In order to prepare various situations which can occur on a road, technology for properly controlling a host vehicle by detecting a driving tendency of a driver of the host vehicle and sharing a driving tendency of a driver of an adjacent vehicle through vehicle-to-vehicle communication.

SUMMARY OF THE INVENTION

According to such a background, an aspect of the present disclosure is to provide a method of analyzing a driving tendency, an apparatus for analyzing a driving tendency, and a system for controlling a vehicle which can promote driving safety by accurately detecting a driving tendency of a driver and sharing driving tendency information through vehicle-to-vehicle communication during driving.

Further, an aspect of the present disclosure is to provide a method and an apparatus for analyzing a driving tendency and a system for controlling a vehicle which can prevent a safety accident by accurately controlling a vehicle on the basis of a driving tendency of a driver.

In accordance with an aspect of the present disclosure, an apparatus for analyzing a driving tendency is provided. The apparatus includes: an image sensor disposed in a vehicle so as to have a field of view exterior of the vehicle, the image sensor configured to capture image data; and a controller comprising at least one processor configured to process the image data captured by the image sensor, wherein the controller is configured to: identify a plurality of objects present in the field of view, responsive at least in part to processing of the image data; determine whether an event is generated, based on at least one of a processing result of the image data and pre-stored driving information of the vehicle; analyze a driving tendency of a driver, based on the driving information and the processing result of the image data, when it is determined that the event is generated; and set a driving level corresponding to the driving tendency of the driver.

In accordance with another aspect of the present disclosure, an apparatus for analyzing a driving tendency is provided. The apparatus includes: an image sensor disposed at a vehicle so as to have a field of view exterior of the vehicle, the image sensor configured to capture image data; a non-image sensor selected from a group consisting of a radar sensor and a lidar sensor, and disposed at the vehicle so as to have a field of sensing exterior of the vehicle, the non-image sensor configured to capture sensing data; and a controller comprising at least one processor configured to process the image data captured by the image sensor and the sensing data captured by the non-image sensor, wherein the controller is configured to: identify a plurality of objects present in the exterior of the vehicle, responsive at least in part to processing by the at least one processor of the image data and the sensing data; determine whether an event is generated, based on at least one of a processing result of at least one piece of the image data and the sensing data and pre-stored driving information of the vehicle; analyze a driving tendency of a driver, based on the processing result of at least one piece of the image data and the sensing data and the driving information, when it is determined that the event is generated; and set a driving level corresponding to the driving tendency.

In accordance with another aspect of the present disclosure, a system for controlling a vehicle is provided. The system includes: an image sensor disposed at a vehicle so as to have a field of view exterior of the vehicle, the image sensor being configured to capture image data; a communication unit configured to transmit or receive driving tendency information and driving information through vehicle-to-vehicle communication; a controller comprising at least one processor configured to process the image data captured by the image sensor, the driving tendency information, and the driving information, wherein the controller is configured to: identify a plurality of objects present in the field of view, responsive at least in part to processing of the image data; determine an identity of an adjacent vehicle by comparing an identifier acquired through processing of received driving tendency information of the adjacent vehicle with an object acquired through processing of the image data to; determine a reliability of the driving information of the adjacent vehicle by comparing a movement state of the object acquired through processing of the image data with received driving information of the adjacent vehicle; determine reference information for controlling the vehicle among the driving information of the adjacent vehicle and the processing result of the image data, based on the reliability; and control the vehicle, based on the reference information and the driving tendency information of the adjacent vehicle.

As described above, the present disclosure can provide a method and an apparatus for analyzing a driving tendency and a system for controlling a vehicle, which can promote driving safety by accurately detecting a driving tendency of a driver during driving on a road and sharing driving tendency information through vehicle-to-vehicle communication.

Further, the present disclosure can provide a method and an apparatus for analyzing a driving tendency and a system for controlling a vehicle, which can prevent a safety accident by accurately controlling vehicles on the basis of a driving tendency of a driver.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, embodiments of the present disclosure will be described in detail with reference to the accompanying drawings. In the description of the elements of the present disclosure, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
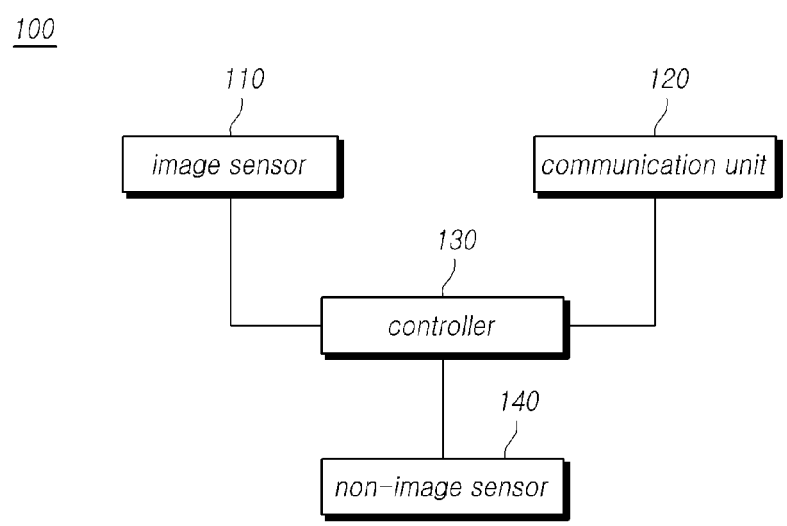
FIG. 1 illustrates elements included in a vehicle according to the present disclosure.

FIG. 1 illustrates elements included in a vehicle 100 according to the present disclosure.

Referring to FIG. 1, the vehicle 100 according to the present disclosure may operate a vehicle control system for controlling the vehicle 100 on the basis of driving tendency information and driving information of adjacent vehicles.

Specifically, the vehicle control system for controlling the vehicle 100 includes an image sensor 110 disposed in the vehicle 100 to have a field of view of an exterior of the vehicle 100 and configured to capture image data, a communication unit 120 configured to transmit or receive driving tendency information and driving information through vehicle-to-vehicle communication, and at least one controller configured to process image data captured by the image sensor, driving tendency information, and driving information.

The image sensor 110 may be disposed in the vehicle 100 to have a field of view of an exterior of the vehicle 100. At least one image sensor 110 may be mounted to each part of the vehicle 100 to have a field of view of the front, side, or rear of the vehicle 100.

Image information captured by the image sensor 110 consists of image data, which corresponds to image data captured by the image sensor 110. Hereinafter, the image information captured by the image sensor 110 may be image data captured by the image sensor 110.

The image data captured by the image sensor 110 may be generated, for example, in one format of AVI, MPEG-4, H.264, DivX, and JPEG in a raw form. The image data captured by the image sensor 110 may be processed by a processor.

The image sensor 110 may include, for example, a multi-function camera, an infrared camera, and a camera having a wide-angle lens.

The image sensor 110 may be disposed to have a field of view in a particular direction of the vehicle 100. For example, the image sensor 110 may include a front camera disposed at a front part of the vehicle 100 to have a field of view of the front of the vehicle 100 and a rear camera disposed at a rear or a rear-side part of the vehicle 100 to have a field of view of the rear or rear-side of the vehicle 100. Further, the image sensor 110 may selectively include one or more cameras as necessary.

The communication unit 120 may use V2X communication which corresponds to vehicle-to-vehicle communication for wireless communication between the vehicle 100 and adjacent vehicles.

V2X according to the present disclosure means an exchange of information between the vehicle and objects, such as an adjacent vehicle, a mobile device, and a road, through a wired/wireless network or technology therefor. V2X includes concepts of Vehicle to Vehicle (V2V), Vehicle to Infrastructure (V2I), Vehicle to Nomadic Device (V2N), and Vehicle to Pedestrian (V2P), and V2V communication is mainly used in the present disclosure.

V2X is on the basis of Dedicated Short-Range Communications (DSRC), and may use Wireless Access in Vehicular Environment (WAVE), recently developed by IEEE or IEEE 802.11p communication technology, using a 5.9 GHz band, but is not limited thereto. It should be understood that V2X includes any vehicle-to-vehicle communication that does not exist at present but is to be developed in the future.

The controller 130 may compare an identifier acquired through processing of the received driving tendency information of an adjacent vehicle with an object acquired through processing of the image data to determine an identity of the adjacent vehicle, compare a movement state of the object acquired through processing of the image data with the received driving information of the adjacent vehicle to determine reliability of the driving information of the adjacent vehicle, determine reference information for controlling the vehicle 100 in the processing result of the driving information of the adjacent vehicle and the image data on the basis of the reliability, and control the vehicle 100 on the basis of the reference information and the driving tendency information of the adjacent vehicle.

The processor may operate to process image data captured by the image sensor 110. That is, the processor may extract or acquire information required for controlling the vehicle 100 by processing data.

Specifically, the processing result of the image data may be information generated by detecting surroundings of the vehicle 100. That is, the processing result of the image data may be information generated by detecting objects existing around the vehicle 100, for example, adjacent vehicles close to the moving vehicle 100, a traffic light, a lane, a road, and a sign.

Further, the processing result of the image data may be information generated by detecting a speed of the object, a distance between the vehicle 100 and the object, a direction in which the object travels, a yaw rate, a lateral acceleration, and a longitudinal acceleration.

Driving information may be information related to driving of the vehicle 100. That is, the driving information may be information on a driving speed of the vehicle 100, a yaw rate, a longitudinal acceleration, a brake input time, and a turn signal, a steering angle, a heading angle, and a vehicle-to-vehicle distance to a preceding vehicle.

In order to generate driving information, a brake pedal input sensor, a steering angle sensor, a vehicle speed sensor, and a yaw rate sensor may be included.

The controller 130 may be implemented as a Domain Control Unit (DCU) for integrating and performing a function of the processor for processing data and a function of outputting a generated control signal to a steering control module and a brake control module to control movement of the vehicle 100.

Meanwhile, the vehicle control system may further include a non-image sensor 140 disposed in the vehicle 100 to have a field of sensing of an exterior of the vehicle 100 and configured to capture sensing data.

The non-image sensor 140 may include, for example, a near infrared sensor, a far infrared sensor, a radar sensor, an ultrasound sensor, and a lidar sensor.

That is, according to an embodiment, the vehicle control system including the controller 130 implemented as the DCU and the non-image sensor 140 includes the image sensor 110 operable to be disposed in the vehicle 100 so as to have a field of view of an exterior of the vehicle 100, the image sensor being configured to capture image data, the non-image sensor 140 operable to be disposed in the vehicle 100 so as to have a field of sensing of an exterior of the vehicle 100, the non-image sensor being configured to capture sensing data; the communication unit 120 configured to transmit or receive driving tendency information and driving information through vehicle-to-vehicle communication; the DCU including at least one processor configured to process at least one piece of the image data captured by the image sensor and the sensing data captured by the non-image sensor, driving tendency information, and the driving information, wherein the DCU compares an identifier acquired through processing of received driving tendency information of an adjacent vehicle with an object acquired through processing of at least one piece of the image data and the sensing data to determine an identity of the adjacent vehicle, compares a movement state of the object acquired through processing of at least one of the image data and the sensing data with received driving information of the adjacent vehicle to determine a reliability of the driving information of the adjacent vehicle, determines reference information for controlling the vehicle among the driving information of the adjacent vehicle and a processing result of at least one piece of the image data and the sensing data, based on reliability, and controls the vehicle 100, based on the reference information and the driving tendency information of the adjacent vehicle.

Driving tendency information is information indicating a driving tendency of a driver of the vehicle 100 or adjacent vehicle, and driving information is information related to driving of the vehicle 100 or the adjacent vehicle.

Although not illustrated, the vehicle control system according to the present disclosure may further include a memory for storing the processing result of image data, the driving tendency information, and the driving information.

Although not illustrated, the vehicle 100 according to the present disclosure may further include a driving device for receiving a control signal generated by the vehicle control system to make the vehicle 100 travel or provide a warning. The driving device may include a steering wheel, an actuator, a warning light, and a display device.

The vehicle control system according to the present disclosure uses the received driving tendency information and driving information of the adjacent vehicle when controlling the vehicle 100. Meanwhile, the vehicle 100 may transmit driving tendency information and driving information of the vehicle 100 to the adjacent vehicle through vehicle-to-vehicle communication, and the vehicle control system according to the present disclosure included in the adjacent vehicles may control the adjacent vehicle on the basis of the driving tendency information and the driving information of the vehicle 100.

As described above, the driving tendency information is information which can be generated by the vehicle 100 or the adjacent vehicle, and more specifically, is information which can be generated by an apparatus for analyzing a driving tendency according to the present disclosure.

Hereinafter, an embodiment of the apparatus for analyzing the driving tendency according to the present disclosure will be described.

Figure 2:
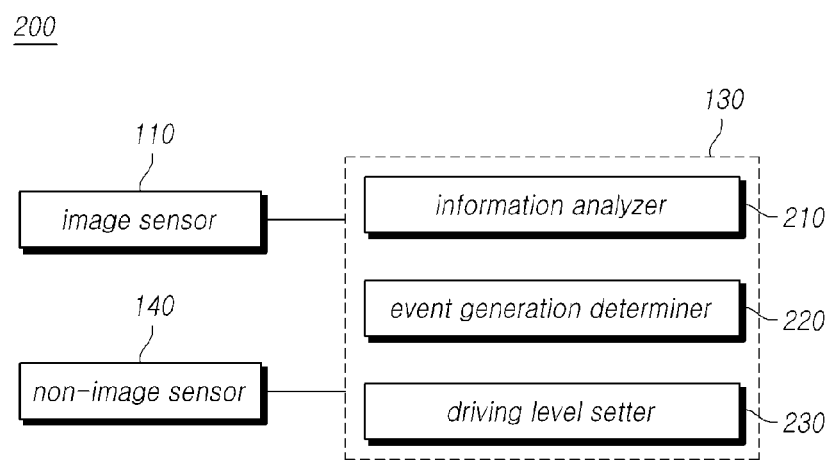
FIG. 2 illustrates elements included in an apparatus for analyzing a driving tendency according to the present disclosure.

FIG. 2 illustrates elements included in an apparatus 200 for analyzing a driving tendency according to the present disclosure.

Referring to FIG. 2, the apparatus 200 for analyzing the driving tendency according to the present disclosure may analyze a driving tendency of a driver of the vehicle 100 or the adjacent vehicle, set a driving level corresponding to the analysis result, and grades the driving tendency. The apparatus 200 for analyzing the driving tendency may be included in the vehicle 100 or the adjacent vehicle.

The driving level may be expressed by numbers, for example, level 1, level 2, level 3, and the like, or by characters, for example, level A, level B, level C, and the like. However, the present disclosure is not limited thereto.

Further, the driving level may be set in a descending order from the highest level to the lowest level or in an ascending order. For example, level 1 may be a level higher than level 2, and level A may be a level higher than level B. However, the present disclosure is not limited thereto.

The driving tendency information may include an identifier (or ID) for identifying the vehicle 100 and a driving level.

In order to perform such a function, the apparatus 200 for analyzing the driving tendency according to the present disclosure includes the image sensor 110 disposed in the vehicle 100 to have a field of view of an exterior of the vehicle 100 and configured to capture image data and the controller 130 including at least one processor configured to process image data captured by the image sensor.

The controller 130 may perform the vehicle control described with reference to FIG. 1 and analyze the driving tendency.

That is, the controller 130 may determine whether an event is generated on the basis of at least one of the processing result of image data and pre-stored driving information of the vehicle 100, when it is determined that the event is generated, analyze a driving tendency of the driver on the basis of the driving information and the processing result of the image data, and set a driving level corresponding to the analysis result.

In order to perform the function, the controller 130 may include an information analyzer 210, an event generation determiner 220, and a driving level setter 230.

The information analyzer 210 may receive and analyze the processing result of the image data generated by detecting surroundings of the vehicle 100 and the driving information of the vehicle 100. That is, the information analyzer 210 may analyze the processing result of the image data and the driving information and extract elements required for analyzing the driving tendency of the driver.

For example, the information analyzer 210 may extract a speed of the adjacent vehicle, a vehicle-to-vehicle distance, and a lateral acceleration of the adjacent vehicle by analyzing the processing result of the image data.

In another example, the information analyzer 210 may extract a speed, a heading angle, and a brake input time of the vehicle 100 by analyzing the driving information.

The event generation determiner 220 may determine whether an event is generated on the basis of at least one of the processing result of the image data and the driving information.

The event may be a plurality of situations which can be generated during driving of the vehicle 100. For example, the event may include a braking event indicating a situation in which the driver puts on the brake on the vehicle 100 and a lane change event indicating a situation in which the vehicle 100 changes lanes. However, the present disclosure is not limited thereto.

When it is determined that the event is generated, the driving level setter 230 may analyze the driving tendency of the driver on the basis of the driving information and the processing result of the image data and sets a driving level corresponding to the analysis result.

The driving level setter 230 may average driving levels set whenever the same event is generated and generate and output the driving tendency information including the averaged driving level and the identifier.

For example, when the driving level setter 230 sets the driving level corresponding to the braking event generated at a particular time point as level 1 and sets the driving level corresponding to the braking event generated at another time point as level 2, the driving level setter 230 may generate and output driving tendency information including level 1.5, generated by averaging level 1 and level 2, and the identifier of the vehicle 100.

Like the description made with reference to FIG. 1, the controller 130 may be implemented as the DCU.

Meanwhile, the apparatus 200 for analyzing the driving tendency according to the present disclosure may further include the non-image sensor 140 disposed in the vehicle 100 to have a sensing field of an exterior of the vehicle 100 and configured to capture sensing data.

That is, according to an embodiment, the apparatus 200 for analyzing the driving tendency including the controller 130 implemented as the DCU and the non-image sensor 140 includes the image sensor 110 operable to be disposed in the vehicle 100 so as to have a field of view of an exterior of the vehicle 100, the image sensor being configured to capture image data; the non-image sensor 140 operable to be disposed in the vehicle 100 so as to have a field of sensing of an exterior of the vehicle 100, the non-image sensor being configured to capture sensing data; and the DCU including at least one processor configured to process at least one piece of the image data captured by the image sensor 110 and the sensing data captured by the non-image sensor 140, wherein the DCU determines whether an event is generated, based on at least one of a processing result of at least one piece of the image data and the sensing data and pre-stored driving information of the vehicle 100, when it is determined that the event is generated, analyzes a driving tendency of a driver, based on the processing result of at least one piece of the image data and the sensing data and the driving information, and sets a driving level corresponding to an analysis result.

Although not illustrated, the apparatus 200 for analyzing the driving tendency according to the present disclosure may further include an information storage unit configured to store the processing result of the image data, the driving information, and the driving tendency information.

Hereinafter, a detailed embodiment for setting a driving level of a driver in a braking event will be described.

Figure 3:
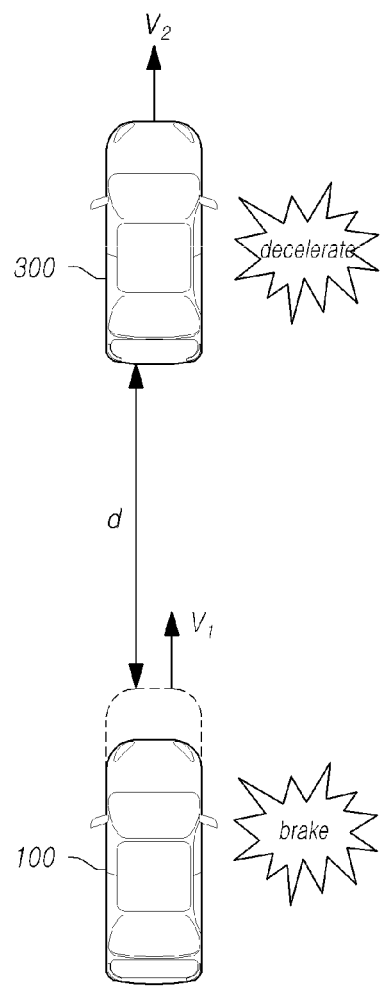
FIG. 3 illustrates an embodiment of a method of analyzing a driving tendency of a driver in a braking event according to the present disclosure.

FIG. 3 illustrates an embodiment of a method of analyzing a driving tendency of a driver in a braking event according to the present disclosure.

Referring to FIG. 3, when a preceding vehicle 300 moving in front of the vehicle 100 decelerates, the apparatus 200 for analyzing the driving tendency according to the present disclosure may identify a time at which the driver of the vehicle 100 presses the brake to analyze the driving tendency in the braking event.

First, the information analyzer 210 may extract a speed of the preceding vehicle 300 and a vehicle-to-vehicle distance from the preceding vehicle 300 required for analyzing the driving tendency in the braking event by analyzing the processing result of the image data.

For example, when the vehicle 100 travels at a driving speed v1 and the preceding vehicle 300 travels at a driving speed v2, the information analyzer 210 extracts a speed of the preceding vehicle 300 and a vehicle-to-vehicle distance between the vehicle 100 and the preceding vehicle 300 by analyzing the processing result of the image data.

When the preceding vehicle 200 decelerates somewhat, the driver of the vehicle 100 may press the brake. At this time, the information analyzer 210 may extract, from the driving information, a brake input time point indicating a time point at which the brake is pressed.

For example, the information analyzer 210 extracts a brake input time point of the vehicle 100 by analyzing the driving information.

Meanwhile, the event generation determiner 220 may determine whether the braking event is generated on the basis of a deceleration extent of the preceding vehicle 300.

For example, when a deceleration amount of the speed of the preceding vehicle 300 meets a preset reference deceleration amount, the event generation determiner 220 determines that the braking event is generated.

The reference deceleration amount may be a value set in consideration of a road condition or a driving environment.

When it is determined that the braking event is generated, the driving level setter 230 may analyze the driving tendency on the basis of the brake input time point extracted by the information analyzer 210 and the vehicle-to-vehicle distance between the vehicle 100 and the preceding vehicle 300.

For example, the driving level setter 230 identifies a vehicle-to-vehicle distance d corresponding to the brake input time point and analyzes the driving tendency on the basis of the distance d between vehicles at the brake input time point.

The driving level setter 230 may set the driving level to be higher as the vehicle-to-vehicle distance d is longer. The driving level setter 230 may set the driving level to be higher as the brake input time point is identified earlier.

That is, the driving level is set to be higher as the vehicle-to-vehicle distance d is longer or the brake input time point is identified earlier.

Meanwhile, the driving level setter 230 may additionally reflect the size of the driving speed v1 of the vehicle 100, the size of the driving speed v2 of the preceding vehicle 300, and a longitudinal acceleration and a lateral acceleration of the vehicle 100 to analyze the driving tendency.

Hereinafter, the braking event generation time point and the brake input time point will be explicitly described through a timing diagram.

Figure 4:
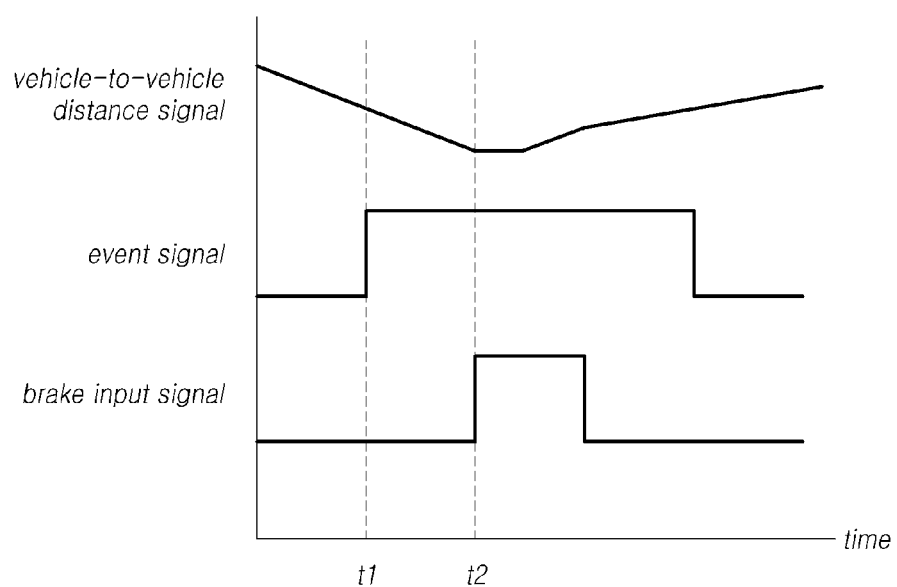
FIG. 4 is a timing diagram of the embodiment of FIG. 3.

FIG. 4 is a timing diagram of the embodiment of FIG. 3.

Referring to FIGS. 3 and 4, the event generation determiner 220 identifies a deceleration amount of the speed of the preceding vehicle 300 extracted by the information analyzer 210.

When the speed of the preceding vehicle 300 continuously decelerates and thus the deceleration amount meets a reference deceleration amount at a first time point t1, the event generation determiner 220 may generate an event signal at the first time point t1 and output the event signal to the driving level setter 230.

When the event signal is received, the driving level setter 230 initiates an analysis process of the driving tendency at the first time point t1. The driving level setter 230 identifies the vehicle-to-vehicle distance between the vehicle 100 and the preceding vehicle 300, extracted by the information analyzer 210.

At this time, when the driving level setter 230 identifies a brake input signal extracted by the information analyzer 210 at a second time point t2, the driving level setter 230 identifies the vehicle-to-vehicle distance d at the brake input time point (for example, the second time point t2).

Subsequently, the driving level setter 230 analyzes the driving tendency on the basis of the brake input time point (for example, the second time point t2) and the vehicle-to-vehicle distance d. Further, the driving level setter 230 sets a driving level corresponding of the analysis result.

The driving level may be set to be higher as a response time (for example, t2−t1) from a time point (for example, the first time point t1) at which the event signal is generated to a time point (for example, the second time point t2) at which the brake input signal is generated is shorter or as the vehicle-to-vehicle distance is longer.

For example, when the driving level setter 230 identifies the brake input signal at the time point t2 and sets the driving level as level 2, the driving level setter 230, if the driving level setter 230 identifies the brake input signal at a time point earlier than the second time point t2 after the next braking event is generated, the driving level is set as level 1.

Meanwhile, when the vehicle 100 changes lanes, the driving tendency of the driver can be analyzed. Hereinafter, a detailed embodiment for setting a driving level of a driver in a lane change event will be described.

Figure 5:
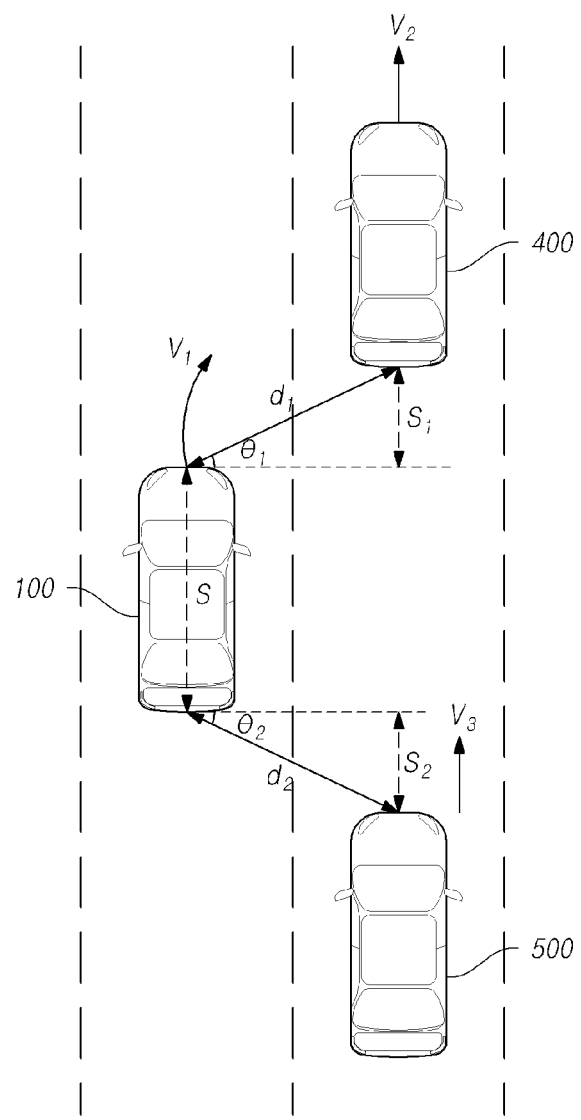
FIG. 5 illustrates an embodiment of a method of setting a lane changeable space in a lane change event according to the present disclosure.
Figure 6:
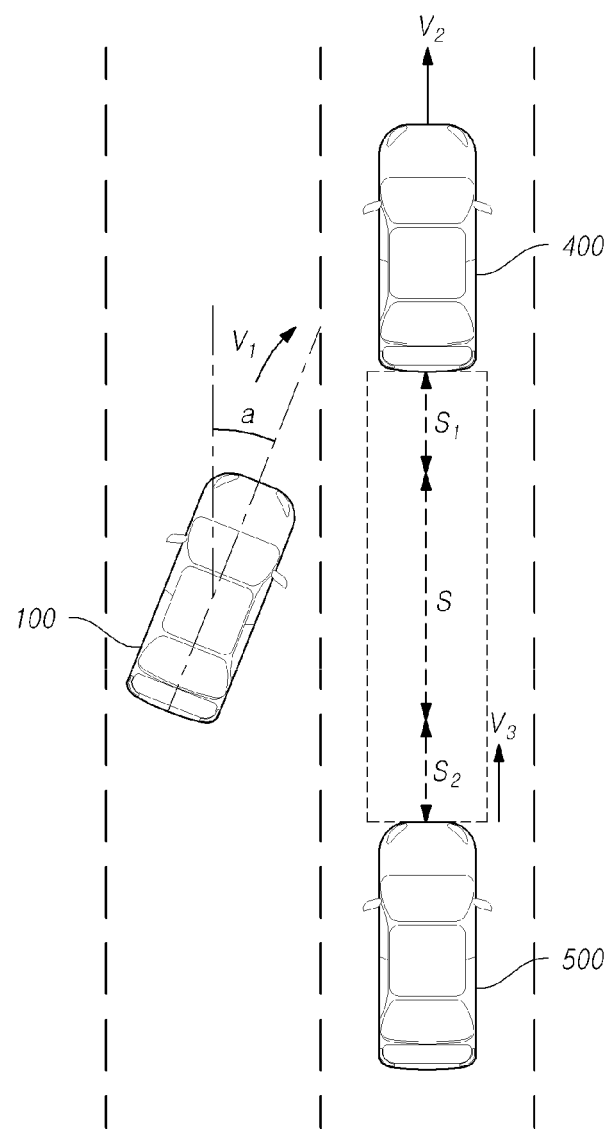
FIG. 6 illustrates an embodiment of the method of analyzing the driving tendency in a lane change event according to the present disclosure.

FIG. 5 illustrates an embodiment of a method of setting a lane changeable space in a lane change event according to the present disclosure, and FIG. 6 illustrates an embodiment of a method of analyzing a driving tendency of a driver in the lane change event according to the present disclosure.

Referring to FIGS. 5 and 6, even when the vehicle 100 changes lanes, the apparatus 200 for analyzing the driving tendency according to the present disclosure may identify a vehicle-to-vehicle distance and a longitudinal length of the vehicle 100 to analyze the driving tendency in the lane change event.

First, the information analyzer 210 may extract a longitudinal vehicle-to-vehicle distance in the distance from an adjacent vehicle by analyzing the processing result of image data.

The adjacent vehicle may be another vehicle moving in an adjacent lane of the vehicle 100, that is, a preceding vehicle 400 or a following vehicle 500.

The longitudinal vehicle-to-vehicle distance is a longitudinal component of the distance between the vehicle 100 and the adjacent vehicle.

For example, the information analyzer 210 extracts a first longitudinal vehicle-to-vehicle distance s1 in a first vehicle-to-vehicle distance d1 from the preceding vehicle 400 included in the adjacent vehicles and a second longitudinal vehicle-to-vehicle distance s2 in a second vehicle-to-vehicle distance d2 from the following vehicle 500 included in the adjacent vehicles.

Specifically, the first longitudinal vehicle-to-vehicle distance s1 may be calculated using the first vehicle-to-vehicle distance d1 and a trigonometric function (for example, sin θ1) for a first angle θ1. Similarly, the longitudinal vehicle-to-vehicle distance s2 may be calculated using the second vehicle-to-vehicle distance d2 and a trigonometric function (for example, sin θ2) for a first angle θ2. However, the present disclosure is not limited thereto.

In order to determine a lane change event situation, the information analyzer 210 may extract at least one of a lane change signal and a steering angle and a heading angle a of the vehicle by analyzing the driving information.

The lane change signal may be a signal generated when the driver of the vehicle 100 controls a turn signal. The steering angle may be a steering angle of a steering wheel detected by a steering angle sensor.

Meanwhile, the event generation determiner 220 may determine whether the lane change event is generated on the basis of at least one the lane change signal and the steering angle.

For example, when the lane change signal is received for a preset reference time, the event generation determiner 220 determines that the lane change event is generated.

In another example, when the steering angle detected by the steering angle sensor meets a preset reference steering angle, the event generation determiner 220 determines that the lane change event is generated.

When it is determined that the lane change event is generated, the driving level setter 230 may set a lane changeable space using the longitudinal vehicle-to-vehicle distance and the pre-stored longitudinal length s of the vehicle 100 and analyze the driving tendency on the basis of the lane changeable space and the heading angle a.

The lane changeable space may be a virtual space required for changing lanes by the vehicle 100.

As described above, when the information analyzer 210 extracts the first longitudinal vehicle-to-vehicle distance s1 in the first vehicle-to-vehicle distance d1 from the preceding vehicle 400 included in the adjacent vehicles and the second longitudinal vehicle-to-vehicle distance s2 in the second vehicle-to-vehicle distance d2 from the following vehicle 500 included in the adjacent vehicles, the driving level setter 230 may reflect the longitudinal length s in at least one of the first longitudinal vehicle-to-vehicle distance s1 and the second longitudinal vehicle-to-vehicle distance s2 and sets the lane changeable space.

For example, when there is only the preceding vehicle 400, the driving level setter 230 sets the lane changeable space (s1+s) by adding the first longitudinal vehicle-to-vehicle distance s1 from the preceding vehicle 400 and the longitudinal length s of the vehicle 100.

In another example, when there is only the following vehicle 500, the driving level setter 230 sets the lane changeable space (s+s2) by adding the second longitudinal vehicle-to-vehicle distance s2 from the following vehicle 500 and the longitudinal length s of the vehicle 100.

In still another example, when there are both the preceding vehicle 400 and the following vehicle 500, the driving level setter 230 sets the lane changeable space (s1+s+s2) by adding the first longitudinal vehicle-to-vehicle distance s1, the second longitudinal vehicle-to-vehicle distance s2, and the longitudinal length s of the vehicle 100.

When the lane changeable space is set, the driving level setter 230 may analyze the driving tendency on the basis of the lane changeable space and the heading angle a of the vehicle 100 and set the driving level.

The driving level may be set to be higher as the lane changeable space is wider or the heading angle is smaller.

The driving level setter 230 may additionally reflect the driving speed v1, the yaw rate, the longitudinal acceleration, the transverse acceleration, and a location coordinate of the vehicle 100, and a driving speed and a location coordinate of the adjacent vehicle to analyze the driving tendency.

Meanwhile, some drivers may change lanes without turning on a turn signal. Accordingly, when the lane change signal is not received, the driving level setter 230 may assign a penalty to the driving tendency and set the driving level to be lower.

Figure 7:
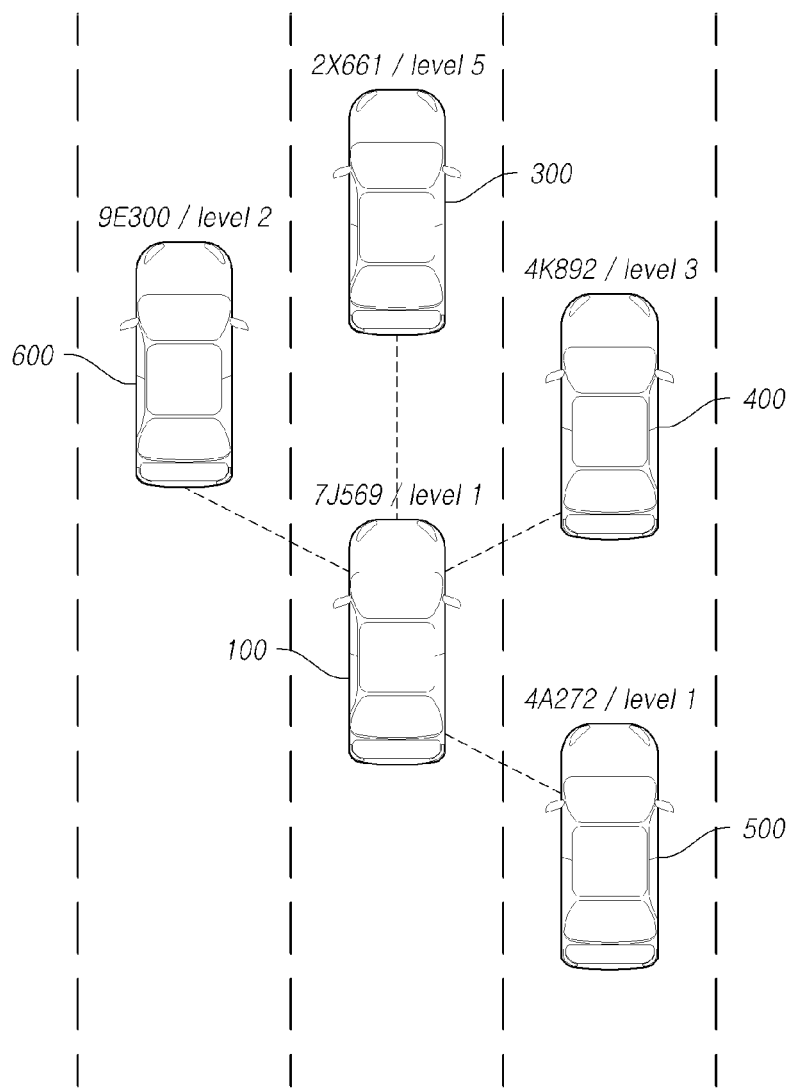
FIG. 7 illustrates identification information and driving tendency information corresponding to each of a vehicle and adjacent vehicles according to the present disclosure.

FIG. 7 illustrates identification information and driving tendency information corresponding to each of the vehicle 100 and adjacent vehicles 300, 400, 500, and 600 according to the present disclosure.

Referring to FIG. 7, each of the vehicle 100 and the adjacent vehicles 300, 400, 500, and 600 has driving tendency information including an identifier and a driving level and driving information.

The vehicle 100 according to the present disclosure may transmit the driving tendency information and the driving information of the vehicle 100 or receive the driving tendency information and the driving information of the adjacent vehicles 300, 400, 500, and 600 through the communication unit 120.

The controller 130 included in the vehicle 100 according to the present disclosure may determine an identity of a particular vehicle among the adjacent vehicles on the basis of the driving tendency information of the adjacent vehicles and the processing result of image data.

For example, the controller 130 determines an identity of the following vehicle 500 by comparing the identifier, for example, 4A272 included in the received driving tendency information of the adjacent vehicle with an object, for example, the detected following vehicle 500 acquired through processing of the image data.

When the identity of the adjacent vehicle is determined, the controller 130 determines reliability of vehicle-to-vehicle communication or reliability of driving information of the adjacent vehicle by comparing a movement state of the object acquired through processing of the image data with the received driving information of the adjacent vehicle.

For example, the controller 130 determines reliability of the driving information of the following vehicle 500 by comparing the movement state of the following vehicle 500 acquired through processing of the image data with the received driving information of the following vehicle 500.

Subsequently, the controller 130 may determine reference information for controlling the vehicle 100 among the driving information of the adjacent vehicle and the processing result of the image data on the basis of the reliability and control the vehicle 100 on the basis of the reference information and the driving tendency information of the adjacent vehicle.

The reference information may be one piece of information selected from the driving information of the adjacent vehicle and the processing result of the image data or information determined to mainly use one piece of information selected from the driving information of the adjacent vehicle and the processing result of the image data and to subsidiarily use the other piece of information.

For example, when the reliability of the driving information of the adjacent vehicle is higher than the reference reliability, the controller 130 determines the driving information of the adjacent vehicles as the reference information and controls the vehicle 100 on the basis of the driving information of the adjacent vehicles and the driving tendency information of the adjacent vehicle.

Although not illustrated, the controller 130 may transfer the driving tendency information of the adjacent vehicle to a display device, and the display device may display the driving tendency information of the adjacent vehicle.

The display device may be a device including a physical display panel or a Head-Up Display (HUD). However, the present disclosure is not limited thereto.

For example, the display device may display the identifier 4A272 of the following vehicle 500 and the driving level 1 included in the driving tendency information of the following vehicle 500. Further, the display device may display a color corresponding to the driving level to allow the driver to intuitively recognize it.

Hereinafter, a method of analyzing a driving tendency by which the present disclosure can be completely implemented will be described.

Figure 8:
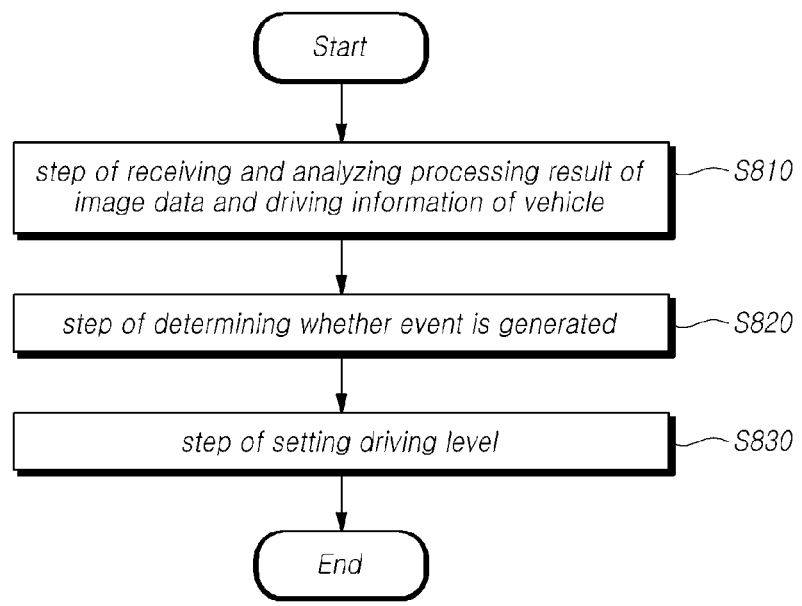
FIG. 8 is a flowchart illustrating the method of analyzing the driving tendency according to the present disclosure.

FIG. 8 is a flowchart illustrating the method of analyzing the driving tendency according to the present disclosure.

Referring to FIG. 8, the method of analyzing the driving tendency according to the present disclosure may include a step S810 of receiving and analyzing a processing result of image data and driving information of a vehicle, a step S820 of determining whether an event is generated, based on at least one of the processing result of the image data and the driving information, and a step S830 of, when it is determined that the event is generated, analyzing a driving tendency of a driver, based on the driving information and the processing result of the image data and setting a driving level corresponding to an analysis result.

As described above, the methods of analyzing the driving tendency in the braking event and the lane change event are different from each other. Hereinafter, the method of analyzing the driving tendency in each of the braking event and the lane change event will be described.

Figure 9:
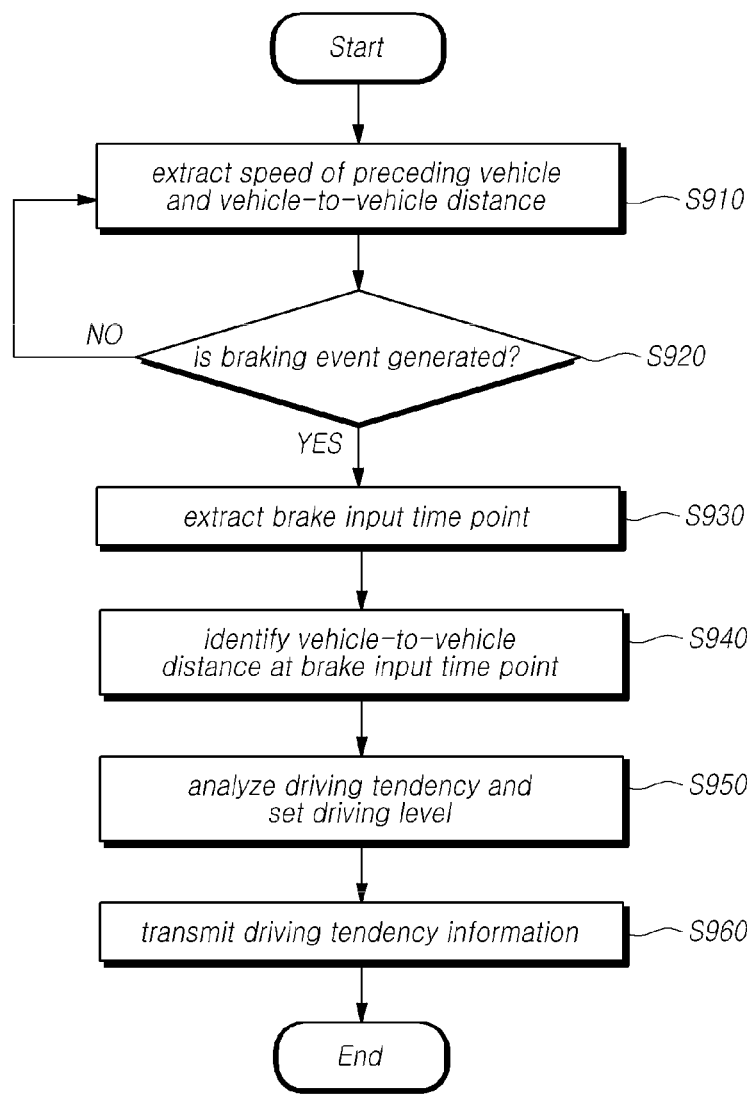
FIG. 9 is a flowchart illustrating the method of analyzing the driving tendency in the braking event according to the present disclosure.

FIG. 9 is a flowchart illustrating the method of analyzing the driving tendency in the braking event according to the present disclosure.

Referring to FIG. 9, the information analyzer 210 extracts a speed of the preceding vehicle 200 and a vehicle-to-vehicle distance between the vehicle 100 and the preceding vehicle 200 on the basis of the processing result of image data in S910.

Subsequently, the event generation determiner 220 determines whether the braking event is generated on the basis of a deceleration amount of the speed of the preceding vehicle 200 in S920.

When it is determined that the braking event is generated, the information analyzer 210 analyzes driving information and extracts a brake input time point in S930.

When it is determined that the braking event is generated, the driving level setter 230 identifies the brake input time point and identifies a vehicle-to-vehicle distance at the brake input time point in S940.

Subsequently, the driving level setter 230 analyzes the driving tendency on the basis of the brake input time point and the vehicle-to-vehicle distance at the brake input time point and sets the driving level corresponding to the analyzed driving tendency in S950.

Thereafter, the driving level setter 230 generates driving tendency information including an identifier and the driving level, and the communication unit 120 transmits the driving tendency information in S960.

Figure 10:
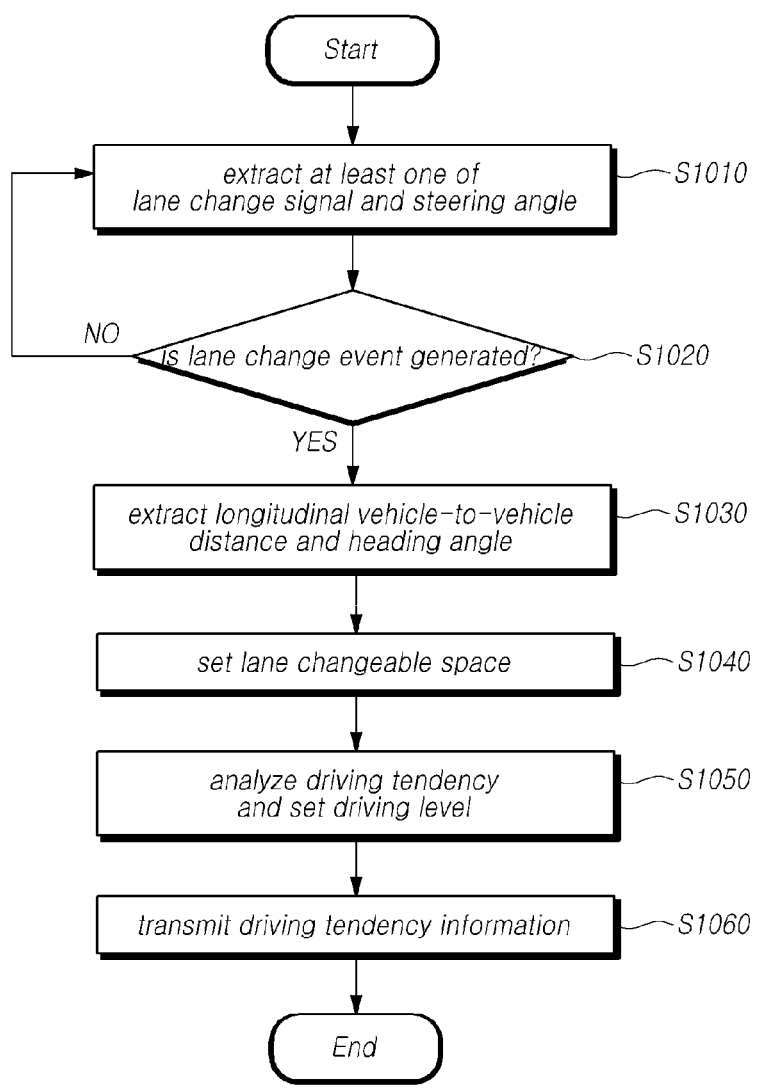
FIG. 10 is a flowchart illustrating the method of analyzing the driving tendency in a lane change event according to the present disclosure.

FIG. 10 is a flowchart illustrating the method of analyzing the driving tendency in the lane change event according to the present disclosure.

Referring to FIG. 10, the information analyzer 210 extracts at least one of a lane change signal and a steering angle by analyzing driving information in S1010.

Subsequently, the event generation determiner 220 determines whether the lane change event is generated on the basis of at least one of the lane change signal and the steering angle in S1020.

When it is determined that the lane change event is generated, the information analyzer 210 extracts a longitudinal vehicle-to-vehicle distance in the vehicle-to-vehicle distance from the adjacent vehicle by analyzing the processing result of image data and extracts a heading angle of the vehicle 100 by analyzing driving information in S1030.

Subsequently, the driving level setter 230 sets a lane changeable space by adding the longitudinal vehicle-to-vehicle distance and a longitudinal length of the vehicle 100 in S1040.

When the lane changeable space is set, the driving level setter 230 analyzes the driving tendency on the basis of the lane changeable space and the heading angle and sets the driving level corresponding to the analyzed driving tendency in S1050.

Thereafter, the driving level setter 230 generates driving tendency information including the identifier and the driving level, and the communication unit 120 transmits the driving tendency information in S1060.

Hereinafter, a method of controlling the vehicle 100 by receiving driving tendency information of the adjacent vehicle and driving information of the adjacent vehicle will be described.

Figure 11:
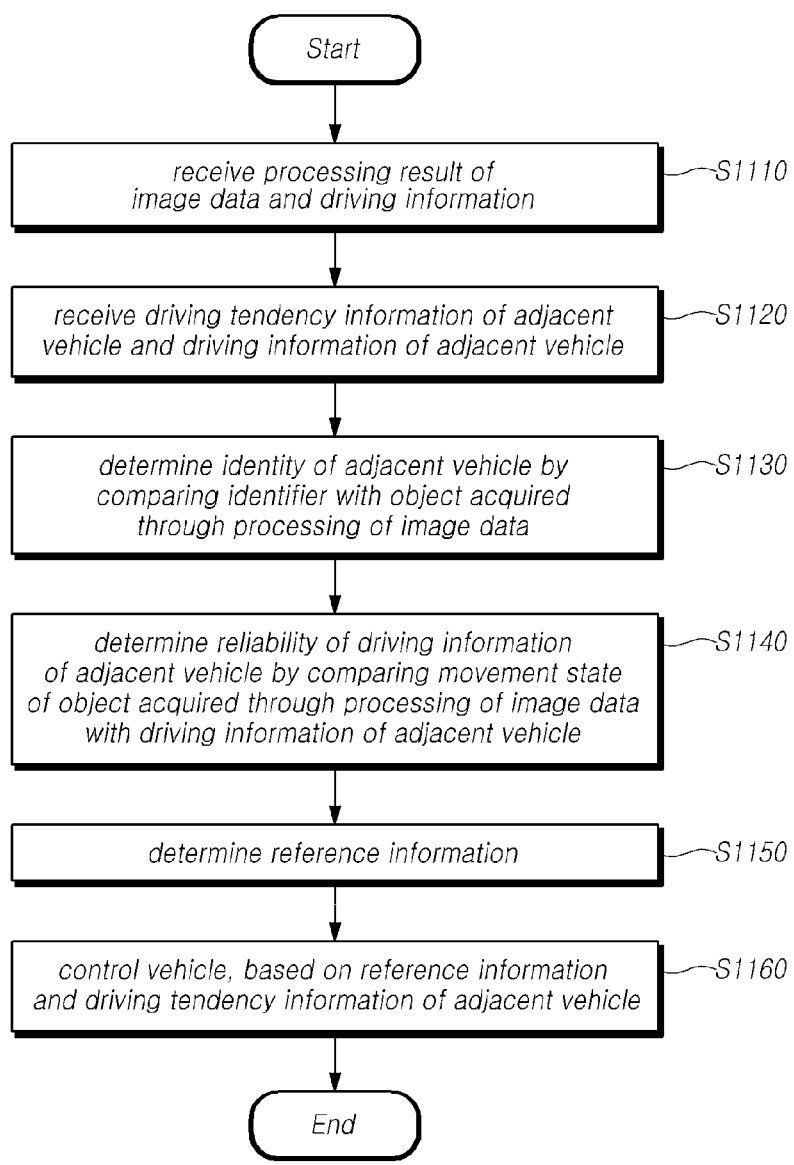
FIG. 11 is a flowchart illustrating a method of controlling the vehicle according to the present disclosure.

FIG. 11 is a flowchart illustrating the method of controlling the vehicle according to the present disclosure.

Referring to FIG. 11, the controller 130 receives the processing result of image data and driving information in S1110.

Meanwhile, the controller 130 receives driving tendency information of the adjacent vehicle and driving information of the adjacent vehicle through the communication unit 120 in S1120.

In order to identify a particular vehicle among the adjacent vehicles existing around the vehicle 100, the controller 130 determines an identity of the adjacent vehicle by comparing an identifier included in the driving tendency information of the adjacent vehicle with an object acquired through processing of image data in S1130.

Subsequently, the controller 130 determines reliability of the driving information of the adjacent vehicle by comparing a movement state of the object acquired through processing of the image data with the driving information of the adjacent vehicle in S1140.

Thereafter, the controller 130 determines reference information on the basis of the reliability of the driving information of the adjacent vehicle in S1150, and controls the vehicle 100 on the basis of the reference information and the driving tendency information of the adjacent vehicle in S1160.

As described above, the present disclosure can provide a method and an apparatus for analyzing a driving tendency and a system for controlling a vehicle, which can promote driving safety by accurately detecting a driving tendency of a driver during driving on a road and sharing driving tendency information through vehicle-to-vehicle communication.

Further, the present disclosure can provide a method and an apparatus for analyzing a driving tendency and a system for controlling a vehicle, which can prevent a safety accident by accurately controlling vehicles on the basis of a driving tendency of a driver.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. That is, at least two elements of all structural elements may be selectively joined and operate without departing from the scope of the present disclosure The scope of the present disclosure shall be construed on the basis of the accompanying claims in such a manner that all of the technical ideas included within the scope equivalent to the claims belong to the present disclosure.

What is claimed is:

1. A driving assistance system for a vehicle, the system comprising:
   one or more sensors mounted to the vehicle and configured to provide sensing data based on sensing objects around the vehicle;
   a controller comprising at least one processor configured to process the sensing data and configured to:
   detect a driving event involving a driver command from a driver of the vehicle, based on processing of driving information of the vehicle;
   determine a distance to another vehicle proximate to the vehicle at the time of the detected driving event, based on processing of the sensing data;

determine a driving tendency of the driver of the vehicle based on the determined distance to the other vehicle and the driving event; and trigger transmission of the driving tendency of the driver for other vehicles proximate to the vehicle using a vehicle-to-vehicle transceiver operative to communicate with other vehicles proximate to the vehicle, wherein the controller determines a distance, determined at a brake input time point at which a brake of the vehicle is activated, to a vehicle preceding the vehicle, wherein the controller determines the driving tendency of the driver of the vehicle based on comparing the determined distance with a predetermined braking threshold distance, and wherein the controller determines a first driving tendency level for the driver of the vehicle based on the determined distance exceeding the predetermined braking threshold distance, and determines a second driving tendency level for the driver higher than the first driving tendency level based on the determined distance being less than the predetermined braking threshold distance.

2. The driving assistance system for a vehicle of claim 1, wherein the controller detects the driving event as a braking event involving a driver braking command from the driver of the vehicle, and determines the distance to the vehicle preceding the vehicle at the brake input time point.

3. The driving assistance system for a vehicle of claim 2, wherein the controller determines the distance to the vehicle preceding the vehicle in response to detecting the braking event, the distance determined by the controller is the distance, at the brake input time point, to the vehicle preceding the vehicle, and the controller determines the driving tendency of the driver of the vehicle based on the distance, determined at the brake input time point, to the vehicle preceding the vehicle.

4. The driving assistance system for a vehicle of claim 1, wherein the controller detects the driving event as a lane change event involving a steering command from the driver of the vehicle, and determines a longitudinal distance along a direction of travel of the vehicle to a vehicle in a lane adjacent to the vehicle.

5. The driving assistance system for a vehicle of claim 4, wherein the controller determines a third driving tendency level for the driver of the vehicle based on the determined longitudinal distance exceeding a predetermined threshold distance, and determines a second fourth driving tendency level for the driver higher than the first driving tendency level based on the determined longitudinal distance being less than the predetermined threshold distance.

6. The driving assistance system for a vehicle of claim 1, wherein the controller triggers transmission of the driving tendency of the driver, with an identifier for the vehicle, to other vehicles proximate to the vehicle using the vehicle-to-vehicle transceiver operative to communicate with the other vehicles proximate to the vehicle.

7. A driving assistance system for a vehicle, the system comprising:

one or more sensors mounted to the vehicle and configured to provide sensing data based on sensing objects around the vehicle;

a controller comprising at least one processor configured to process the sensing data and configured to:

detect a driving event involving a driver command from a driver of the vehicle, based on processing of driving information of the vehicle;

determine a distance to another vehicle proximate to the vehicle at the time of the detected driving event, based on processing of the sensing data;

determine a driving tendency of the driver of the vehicle based on the determined distance to the other vehicle and the driving event; and trigger transmission of the driving tendency of the driver for other vehicles proximate to the vehicle using a vehicle-to-vehicle transceiver operative to communicate with other vehicles proximate to the vehicle, wherein the controller determines the driving tendency of the driver of the vehicle based on a distance, determined at a brake input time point at which a brake of the vehicle is activated, to a vehicle preceding the vehicle, and wherein the controller detects the driving event as a lane change event involving a turn signal activation command from the driver of the vehicle, and determines a longitudinal distance along a direction of travel of the vehicle to a vehicle in a lane adjacent to the vehicle.

8. The driving assistance system for a vehicle of claim 7, wherein the controller determines a first driving tendency level for the driver of the vehicle based on the determined longitudinal distance exceeding a predetermined threshold distance, and determines a second driving tendency level for the driver higher than the first driving tendency level based on the determined longitudinal distance being less than the predetermined threshold distance.

9. A vehicle comprising:

an engine, a braking system, and a steering system; and
the driver assistance system of claim 1.

10. A driving assistance method for a vehicle, the method comprising:

detecting a driving event involving a driver command from a driver of the vehicle, based on processing of driving information of the vehicle;

determining a distance to another vehicle proximate to the vehicle at the time of the detected driving event, based on processing of sensing data obtained by sensing objects around the vehicle;

determining a driving tendency of the driver of the vehicle based on the determined distance to the other vehicle and the driving event; and triggering transmission of the driving tendency of the driver to other vehicles proximate to the vehicle using a vehicle-to-vehicle transmission, wherein a distance, determined at a brake input time point at which a brake of the vehicle is activated, to a vehicle preceding the vehicle is determined, wherein the driving tendency of the driver of the vehicle is determined based on comparing the determined distance with a predetermined braking threshold distance, and wherein the driving tendency is determined as a first driving tendency level for the driver of the vehicle based on the determined distance exceeding the predetermined braking threshold distance, and is determined as a second driving tendency level for the driver higher than the first driving tendency level based on the determined distance being less than the predetermined braking threshold distance.

11. The driving assistance method of claim 10, wherein when the driving event is detected as a braking event involving a driver braking command from the driver of the vehicle, the distance is determined as the distance to the vehicle preceding the vehicle at the brake input time point.

12. The driving assistance method of claim 11, wherein the determining a distance comprises determining the distance to the vehicle preceding the vehicle in response to detecting the braking event, the distance determined by the controller is the distance, at the brake input time point, to the vehicle preceding the vehicle, and the determining a driving tendency comprises determining the driving tendency of the driver of the vehicle based on the distance, determined at the brake input time point, to the vehicle preceding the vehicle.

13. The driving assistance method of claim 10, wherein when the driving event is detected as a lane change event involving a steering command from the driver of the vehicle, the distance is determined as a longitudinal distance along a direction of travel of the vehicle to a vehicle in a lane adjacent to the vehicle.

14. The driving assistance method of claim 10, wherein the triggering transmission comprises triggering transmission of the driving tendency of the driver, with an identifier for the vehicle, to other vehicles proximate to the vehicle using the vehicle-to-vehicle transceiver operative to communicate with the other vehicles proximate to the vehicle.

15. A driving assistance method for a vehicle, the method comprising:
  detecting a driving event involving a driver command from a driver of the vehicle, based on processing of driving information of the vehicle;
  determining a distance to another vehicle proximate to the vehicle at the time of the detected driving event, based on processing of sensing data obtained by sensing objects around the vehicle;
  determining a driving tendency of the driver of the vehicle based on the determined distance to the other vehicle and the driving event; and
  triggering transmission of the driving tendency of the driver to other vehicles proximate to the vehicle using a vehicle-to-vehicle transmission,
  wherein the driving tendency of the driver of the vehicle is determined based on a distance, determined at a brake input time point at which a brake of the vehicle is activated, to a vehicle preceding the vehicle, and
  wherein when the driving event is detected as a lane change event involving a turn signal activation command from the driver of the vehicle, the distance is determined as a longitudinal distance along a direction of travel of the vehicle to a vehicle in a lane adjacent to the vehicle.

16. The driving assistance method of claim 15, wherein the driving tendency is determined as a first driving tendency level for the driver of the vehicle based on the determined longitudinal distance exceeding a predetermined threshold distance, and determined as a second driving tendency level for the driver higher than the first driving tendency level based on the determined longitudinal distance being less than the predetermined threshold distance.

17. A non-transitory computer-readable medium storing computer-executable instructions which, when executed by a processor, provide driving assistance functions comprising the steps of claim 10.

* * * * *